US010740648B1

(12) United States Patent
Maurer et al.

(10) Patent No.: US 10,740,648 B1
(45) Date of Patent: *Aug. 11, 2020

(54) SYSTEM AND METHOD FOR AUTOMATICALLY IDENTIFYING AND MATCHING A COLOR OF A STRUCTURE'S EXTERNAL SURFACE

(71) Applicant: State Farm Mutual Automobile Insurance Company, Bloomington, IL (US)

(72) Inventors: Jonathan D. Maurer, Bloomington, IL (US); Nicholas U. Christopulos, Bloomington, IL (US); Lee C. Drinan, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 176 days.

This patent is subject to a terminal disclaimer.

(21) Appl. No.: 15/980,154

(22) Filed: May 15, 2018

Related U.S. Application Data

(63) Continuation of application No. 15/170,275, filed on Jun. 1, 2016, now Pat. No. 10,007,861, which is a
(Continued)

(51) Int. Cl.
*G01J 3/52* (2006.01)
*G06K 9/46* (2006.01)
(Continued)

(52) U.S. Cl.
CPC .......... *G06K 9/4652* (2013.01); *G01J 3/0264* (2013.01); *G01J 3/52* (2013.01);
(Continued)

(58) Field of Classification Search
CPC .... G06T 7/80; G06T 7/74; G06T 7/85; G06T 7/70; G06T 7/90; G01J 3/508;
(Continued)

(56) References Cited

U.S. PATENT DOCUMENTS 4,887,906 A 12/1989 Koehler
5,911,003 A 6/1999 Sones
(Continued)

OTHER PUBLICATIONS

Preliminary amendment claim set filed Jun. 1, 2018 of U.S. Appl. No. 15/971,059, filed May 4, 2018, 4 pages. (Year: 2018).*
(Continued)

*Primary Examiner* — Andrew M Moyer
*Assistant Examiner* — Dennis Rosario
(74) *Attorney, Agent, or Firm* — Marshall, Gerstein & Borun LLP

(57) ABSTRACT

The method and system may be used to provide an indication of a color value for a particular siding sample and to color match a specific siding product to the color value of the siding sample. The system receives a digital image of a siding sample and a desired color value to be matched. A color query module plots this desired color value as a desired color point in a multidimensional color space together with a plurality of color reference points. Each color reference point represents the color value of an existing siding product. The system determines a "distance" between the desired color point and each plotted color reference point within the color space and identifies the siding product associated with the color reference point that is located the shortest distance to the desired color point within the color space.

20 Claims, 5 Drawing Sheets

Related U.S. Application Data continuation of application No. 14/870,209, filed on Sep. 30, 2015, now Pat. No. 9,384,542, which is a continuation of application No. 14/176,734, filed on Feb. 10, 2014, now Pat. No. 9,183,641.

(51) Int. Cl.

| | | |
|---|---|---|
| *G01J 3/02* | (2006.01) | |
| *G06K 9/32* | (2006.01) | |
| *G06K 9/38* | (2006.01) | |
| *G06K 9/42* | (2006.01) | |
| *G06K 9/62* | (2006.01) | |
| *G01J 3/46* | (2006.01) | |
| *G06T 7/90* | (2017.01) | |

(52) U.S. Cl.
CPC ............ *G06K 9/3208* (2013.01); *G06K 9/38* (2013.01); *G06K 9/42* (2013.01); *G06K 9/6215* (2013.01); *G01J 3/463* (2013.01); *G06T 7/90* (2017.01)

(58) Field of Classification Search
CPC .... G01J 3/524; G01J 3/463; G01J 3/50; G01J 3/52; G01J 3/46; G01J 3/0272; G01J 3/02; G01J 3/0264; G01J 3/0278; G01J 3/522; H04N 1/6033; G01N 21/251; A61C 19/10; G06K 9/4652; G06K 9/3208
See application file for complete search history.

(56) References Cited

U.S. PATENT DOCUMENTS

| | | | |
|---|---|---|---|
| 6,628,829 | B1 | 9/2003 | Chasen |
| 6,766,050 | B1 | 7/2004 | Saikawa et al. |
| 6,809,330 | B2 * | 10/2004 | Krohn ................ H04N 1/00002 250/559.36 |
| 7,283,238 | B2 | 10/2007 | Simons |
| 8,009,884 | B2 | 8/2011 | Chio |
| 8,718,385 | B2 | 5/2014 | Lin et al. |
| 8,743,137 | B2 | 6/2014 | Peters et al. |
| 8,872,923 | B2 | 10/2014 | Gottwals et al. |
| 8,885,934 | B2 | 11/2014 | Lings et al. |
| 8,983,181 | B2 | 3/2015 | Wachtell et al. |
| 9,183,641 | B2 | 11/2015 | Maurer |
| 9,384,542 | B1 | 7/2016 | Maurer |
| 10,007,861 | B1 * | 6/2018 | Maurer ................ G06K 9/6202 |
| 2003/0151661 | A1 | 8/2003 | Turpin |
| 2006/0190836 | A1 | 8/2006 | Ling Su et al. |
| 2007/0002157 | A1 | 1/2007 | Shintani |
| 2007/0242877 | A1 | 10/2007 | Peters et al. |
| 2008/0044082 | A1 | 2/2008 | Muller |
| 2012/0113244 | A1 | 5/2012 | Nielsen et al. |
| 2013/0235398 | A1 | 9/2013 | Bhatti et al. |
| 2013/0257888 | A1 | 10/2013 | Behrens et al. |
| 2014/0153066 | A1 | 6/2014 | Booppanon |
| 2014/0232923 | A1 | 8/2014 | Koh et al. |
| 2014/0285806 | A1 | 9/2014 | Haas |
| 2015/0070510 | A1 | 3/2015 | Mui |
| 2015/0120759 | A1 | 4/2015 | Kang |

OTHER PUBLICATIONS

Bhatti et al, SPIE: Mobile Cosmetics Advisor: An Imaging Based Mobile Service, Jan. 28, 2010 [retrev Feb. 22, 2018], Multimedia on Mobile Devices 2010, vol. 7542, 12 pages total.Frm Iternet: https://www.spiedigitallibrary.org/conference-proceedings-of-spie/7542/754205/Mobile=cosmetics-advisor-an-imaging-based-mobile-service/10.1117/12.840303.full?SSO=1.

Gehring et al., Mobile Product Customization, Apr. 10-15, 2010 [retrieved Sep. 20, 2017], CHI '10 Extended Abstracts on Human Factors in Computing Systems, pp. 3463-3468. Retrieved from the Internet: http://dl.acm.org/citation.cfm?id=1754002.

U.S. Appl. No. 14/870,209, filed Sep. 30, 2015.

U.S. Appl. No. 14/870,209, Non-final Office Action, dated Jan. 4, 2016.

U.S. Appl. No. 14/870,209, Notice of Allowance, dated Apr. 21, 2016.

U.S. Appl. No. 14/176,734, Non-final Office Action, dated May 2, 2014.

U.S. Appl. No. 14/176,734, Final Office Action, dated May 4, 2015.

U.S. Appl. No. 14/176,734, Final Office Action, dated Aug. 25, 2014.

U.S. Appl. No. 14/176,734, Non-final Office Action, dated Dec. 10, 2014.

U.S. Appl. No. 14/176,734, Notice of Allowance, dated Aug. 13, 2015.

U.S. Appl. No. 14/176,734, filed Feb. 10, 2014.

* cited by examiner

SYSTEM AND METHOD FOR AUTOMATICALLY IDENTIFYING AND MATCHING A COLOR OF A STRUCTURE'S EXTERNAL SURFACE

CROSS-REFERENCE TO RELATED APPLICATIONS

This application is a continuation of U.S. patent application Ser. No. 15/170,275, filed on Jun. 1, 2016, which is a continuation of U.S. patent application Ser. No. 14/870,209, filed on Sep. 30, 2015, now U.S. Pat. No. 9,384,542, which is a continuation of U.S. patent application Ser. No. 14/176,734, filed on Feb. 10, 2014, now U.S. Pat. No. 9,183,641, each of which are incorporated herein by reference in their entireties.

FIELD OF THE DISCLOSURE

The present disclosure relates to siding identification and, more particularly, to automatically identifying the color of siding.

BACKGROUND

After sustaining exterior siding damage to a residence or a commercial building, a property owner typically file a claim with their insurance company. In response to these claims, the insurance company assigns an agent to investigate the claims to determine the extent of damage and to provide their clients with appropriate compensation. However, agents have had long-standing difficulties identifying the color of the damaged exterior siding, in particular, which often leads to repair delays and/or unnecessary expenses. For example, if the color of damaged siding on a home is misidentified, the incorrectly ordered (and some cases actually installed) replacement siding may not match the color of the existing siding to the satisfaction of the homeowner. In this case, the contractor may need to return the replacement siding, to reattempt identify the damage siding, and to install a new type of replacing siding that all leads to project delays and increased costs.

Correctly identifying the color of siding may be a tedious, expensive, and/or inexact process. For example, the agent typically obtains a physical sample of the siding by removing a section of damaged siding from the building by locating a section of siding on the building that is similar to the damaged siding. The agent may then physically hold different color swatch samples of existing siding products up to the siding to visually compare each color swatch to the damaged siding sample. This process of identifying the color of the siding via matching the most similar color swatch is subjective and inexact. Moreover, the agent requires costly and time intensive training to account for fading of the damaged siding as well as changing light conditions (e.g., an overcast sky, reflections from snow covered ground, etc.) Furthermore, not only is this manual color swatch identification process incredibly time consuming for the agent, but the insurance company must also maintain, update, and distribute a large inventory of color swatch samples to each agent.

Another example of color identification of siding include the use of colorimeters, spectrometers, and spectrocolorimeters. While these color identification devices are more accurate than physically holding up color swatch samples in determining a color for a specific piece of siding, the devices are cost-prohibitive for mass adoption of agents. Moreover, even if one of these devices are utilized in determining a color, the problem of identifying a replacement siding product available in the market that most closely matches the determined color still exists.

DETAILED DESCRIPTION

Generally, a color identification system automatically provides an indication of a color value for a particular sample of exterior siding and determines a specific siding product that most closely matches the color value of the siding sample. To determine a replacement siding product for a sample piece of siding, a user may capture a digital image of the sample piece of siding and of a color reference card that is placed closely to the siding sample. The system transfers the image and a user-specified region of interest within the image that denotes a desired color value to be matched to a color matching engine for processing. In response to receiving the image and the desired color value, a color normalization module may use the color values of the color reference card with in the image to adjust the color balances of the entire image, including the desired color value, to account for lighting conditions, glares, etc. A color query module then plots this adjusted desired color value as a desired color point in a multidimensional color space together with a plurality of color reference points retrieved from a color reference database. Each color reference point represents the color value of an existing siding product available for purchase in the market and a possible replacement candidate for the siding. To determine the closest matching replacement siding product, the color query module determines a "distance" between the desired color point and each plotted color reference point within the color space. The color query module identifies the siding product associated with the color reference point that is located the shortest distance to the desired color point within the color space.

This technique is discussed in more detail below with reference to FIGS. 1-5. In particular, an example system in which a color query software module may identify the color of siding is described with reference to FIG. 1, an example screenshot illustrating the capturing of a digital image of siding with overlay is discussed with reference to FIG. 2, example techniques which the color query software module determines the closest matching color to the desired color of sample siding are discussed with reference to FIGS. 3 and 4, and an example method which the color query software module may implement to provide a process for identifying the color of siding are discussed with reference to FIG. 5. Furthermore, the techniques directed to siding matching herewith are not to be limited to only siding products, but also may be implemented to match the color of soffit, gable vents, louvered vents, gutters, downspouts, trim corners, shutters, and other related trim items. Still further, the techniques herewith are not limited to trim items but also may be used to match the color of shingles on a building's roof, the color of bricks, or even the color of one or more panels on a motor vehicle, such as an automobile, a motorcycle, a boat, etc.

Figure 1:
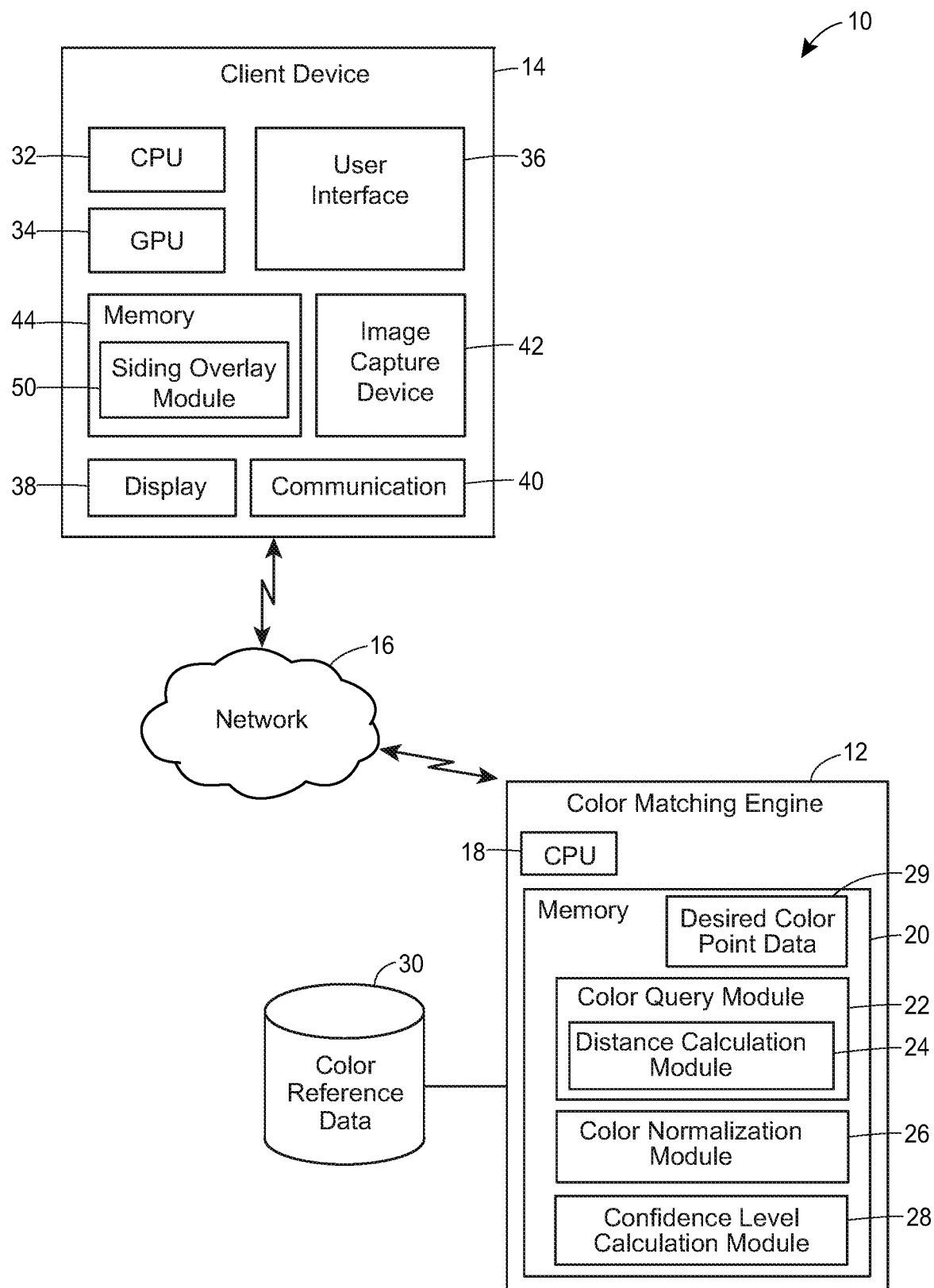
FIG. 1 is a block diagram of an example system in which techniques for identifying the color of siding are implemented.

Referring first to FIG. 1, a color matching system 10 includes a client device 14 that may be connected to a color matching engine 12 via any hardwired or wireless digital communication network 16, including for example a hardwired or wireless local area network (LAN), metropolitan area network (MAN) or wide area network (WAN), the Internet, or any combination thereof. The client device 14 may be, for example, a mobile device, a computer such as a laptop, a tablet, a desktop, or other suitable type of computer. The client device 14 may be communicatively connected to the color matching engine 12 via any suitable communication system, such as any publically available and/or privately owned communication network, including those that use hardwired based communication structure, such as telephone and cable hardware, and/or wireless communication structure, such as wireless communication networks, including for example, wireless LANs and WANs, satellite and cellular phone communication systems, etc.

In the embodiment illustrated in FIG. 1, the client device 14 may include a CPU 32, a graphics processing unit (GPU) 34, a computer-readable memory 44, a display 38, a communication module 40, an image capture device 42, and a user interface 36. The image capture device 42 may be a built-in camera within a mobile device or may be an external camera, such as a webcam, that is communicatively coupled with the mobile device or a computer. Furthermore, the image capture device 42 may be a digital camera that is capable of transferring digital images to the client device 14 or directly to the color matching engine 12 via a cable, a wireless transmission, or a physical memory card transfer (e.g., SD Card, Flash card, etc.) for example. The user-input device (not shown) may include a "soft" keyboard that is displayed on the display 38 of the client device 14, an external hardware keyboard communicating via a wired or a wireless connection (e.g., a Bluetooth keyboard), an external mouse, or any other suitable user-input device. The memory 24 is a computer-readable non-transitory storage device that may include both persistent (e.g., a hard disk) and non-persistent (e.g., RAM) memory components, stores instructions executable on the CPU 32 and/or the GPU 34 that make up a siding overlay module 50. The siding overlay module 50, for example, may allow a user to easily position a siding sample within an appropriate distance from and position relative to the image capture device 42. This proper positioning of the siding sample may help to ensure the captured digital image of the siding sample is an appropriate quality to be properly processed by the color matching engine 12.

Referring still to FIG. 1, the color matching engine 12 may be, for example, disposed within a web server, a laptop computer, a tablet computer, a smartphone, or even the client device 14, etc. In the embodiment illustrated in FIG. 1, the color matching engine 12 is a separate device from the client device 14 and includes a central processing unit (CPU) 18 and a computer-readable memory 20. The memory 20 is a computer-readable non-transitory storage device that may include both persistent (e.g., a hard disk) and non-persistent (e.g., RAM) memory components, stores instructions executable on the CPU 18 that make up a color query module 22 and desired color point data 29 on which the color query module 22 operates. The color query module 22 includes a distance calculation module 24 that calculates a "distance" between two color points in a two-dimensional or a 3D color space. Furthermore, the memory 20 may include a color normalization module 26 that adjusts or normalizes a received digital image based on particular lighting conditions, glare, etc. Still further, the memory 20 may include a confidence level calculation module 28 that determines a confidence level based on the determined result(s) from the color query module 22.

The color query module 22 according to various implementations operates as a separately executable software application, a plugin that extends the functionality of another software application such as a web browser, an application programming interface (API) invokable by a software application, etc. The instructions that make up the color query module 22 may be compiled and executable on the CPU 18 directly, or not compiled and interpreted by the CPU 18 at runtime. Further, the distance calculation module 24 may be provided as an integral part of the color query module 22 or as a separately installable and downloadable component. Furthermore, the color matching engine 12 may be connected or coupled to a color reference database 30 that provides the color reference data to the color query module 22. The color reference database 30 may store color reference data pertaining to individual siding products that are available on the market and that are possible replacement candidates of the siding sample. The color reference data may include not only color data of a particular siding product, but also manufacturer information, product information (e.g., a product number, a product name, a product price, etc.) Of course, the color reference database 30 may be disposed within the color matching engine 12 depending on implementations.

For simplicity, FIG. 1 illustrates the color matching engine 12 as only one instance of an engine or a server device. However, the color matching engine 12, according to some implementations, may alternatively consist of a group of one or more color matching engines, each equipped with one or more processors and capable of operating independently of the other color matching engines. Color matching engines operating in such a group can process requests from the client device 14 individually (e.g., based on availability), in a distributed manner where one operation associated with processing a request is performed on one color matching engine while another operation associated with processing the same request is performed on another color matching engine, or according to any other suitable technique. For the purposes of this discussion, the term "color matching engine" may refer to an individual color matching engine or to a group of two or more color matching engines.

Figure 2:
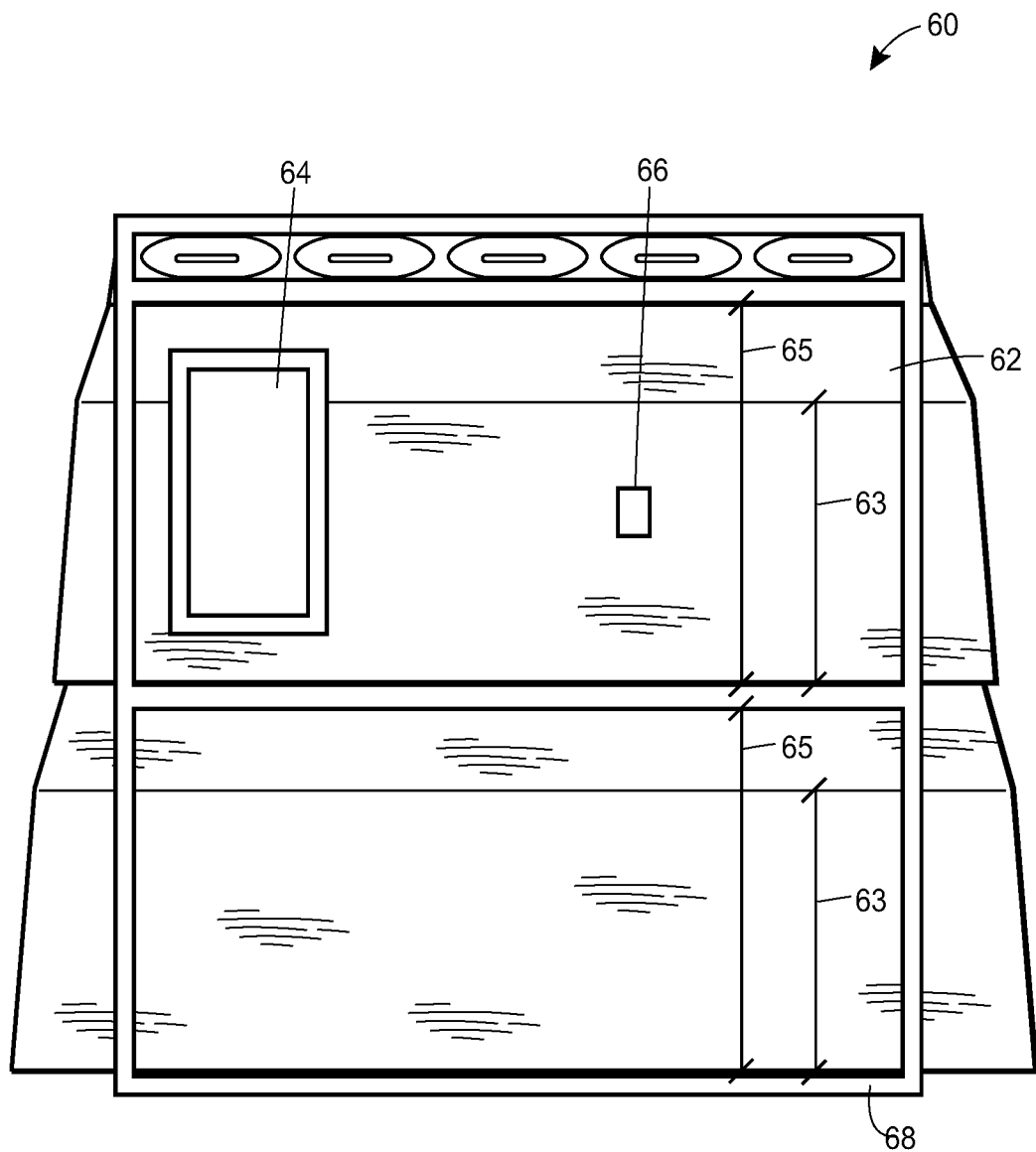
FIG. 2 is an example screenshot that illustrates the display of a digital image of a siding sample with a color identification overlay.

Now referring to FIG. 2, an example screenshot 60 illustrates a digital image of a siding sample 62 with an exemplary positional overlay 68 that includes a color reference card area 64 (i.e. a predetermined or previously known color area.) When a user positions an image capture device 42 to capture an image of a siding sample 62, the positional overlay 68 aids the user in determining an appropriate distance and orientation at which to capture the siding sample. Moreover, the positional overlay 68 may assist in not only correctly framing the shot of the siding but also in reducing potential glare and in maintaining a proper distance and orientation of the current siding sample. For example, the positional overlay may assist the user in positioning the siding sample so that each face 63 and/or each profile 65 of the siding sample is directly visible to and parallel to the lens of the image capture device to reduce glare. Furthermore, the positional overlay 68 may include a color reference card area 64 that aids the user in determining correct physical placing of a color reference card or color balance card on the siding sample before capturing the digital image 62.

A color reference card may be a flat, physical card or object that generally is uniformly colored one predetermined color or known color to the system 10. For example, a known color appearing on a color reference card may include a precise color value, such as 18% gray (i.e., a middle gray color that has an 18% reflectance across the visible spectrum,) that may be used in color adjusting or white balancing the image 62. Of course, the color reference card may include multiple precise color values that are oriented in a particular pattern, such as a ColorChecker chart, etc. The user may indicate the location of the color reference card within the digital image 62, or the system 10 may automatically determine the location of color reference card based on a predetermined location within the digital image 62, a predetermined size, a predetermined shape, etc.

In any event, a current color card value may be obtained from the color reference card area 64 of the digital image 62 and may be quantified into current color card value data. This current color card value data may be compared against the known color value data of the color reference card to determine the difference in color values, color characteristics, etc. These color value differences between the current color card value data and the known color value data may be used to determine the effect of lighting conditions, glare reflections, image capture device configurations, etc. on the digital image of siding sample 62. These color value differences may be used in determining an adjustment or a normalization process in correcting the white balance, color levels, etc. for the entire image of the siding sample 62. After this normalization process, the colors of the image 62 may be more accurate and assist in obtaining better color matching results.

Still referring to FIG. 2, the user may additionally specify a region of interest 66 within the digital image 62 that indicates the user's desired color to be matched. The location of this region of interest 66 within the image 62 may be transmitted in conjunction with the image 62 as a color matching request to the color matching engine 12. Alternatively, the client device 14 may determine the color value of the desired color to be matched and transfer the desired color value together with the image 62 to the color matching engine 12.

Continuing with this example scenario, the color matching engine 12 receives the color matching request that includes the digital image 62 of a sample siding and specifies the region of interest 66 within the digital image 62 that indicates the desired color to be identified. In response to this color matching request, the color matching engine 12 may determine the color value of the desired value associated with the region of interest 66 and may plot or graph the desired color value as a desired color point within a color space.

Figure 3:
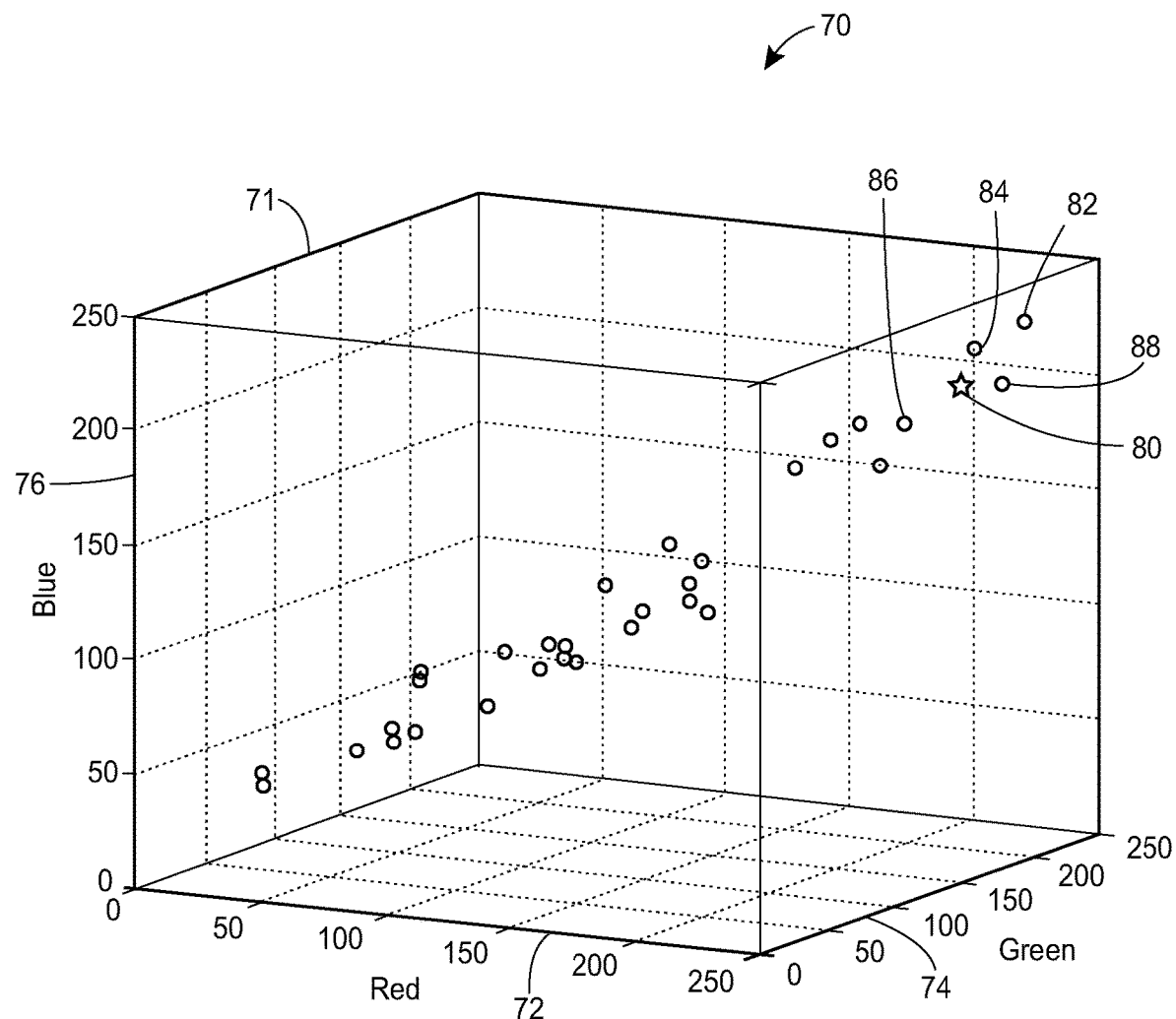
FIG. 3 is an example plot visualization of a desired color point and reference color points in a three dimensional (3D) color space.

Referring to FIG. 3, for example, a plot visualization of a 3D color space 70 illustrates the desired color value as a desired color point 80 plotted in a 3D color space 71. In this example, the 3D color space 71 is a red-green-blue (RGB) color space that includes a red axis 72, a green axis 74, and a blue axis 76. Each axis, as shown in FIG. 3, represents one of the three RGB color components of a RGB color value. Thus, a particular RGB color value may be plotted as a single color point within in the 3D color space as illustrated by the desired color point 80. For instance, the desired color point 80 includes the RGB color components (R: 200, G: 150, B: 225). In this example, each color component value ranges from 0 to 255.

In any event, after the desired color value is plotted as a desired color point 80 in the 3D color space 71, the color query module 22 may retrieve color reference data from the color reference database 30. Moreover, the color reference data represents individual siding products that are available on the market and that serve as possible siding replacement candidates. In particular, each individual siding product represented in the color reference database 30 was previously imaged, normalized, and analyzed, similar to the techniques described above, to determine a specific color value and the associated reference color point for that individual siding product. In turn, each one of these reference color points associated with an individual siding product may be plotted together in one color space For example, as illustrated in FIG. 3, reference color points associated with individual products are plotted within the 3D color space 71 together with the desired color point 80 determined from the digital image of the siding sample 62. In particular, some of the plotted reference color points 82-88, in this example, are closer to the desired color point 80 than other reference color points. While a distance between the desired color point 80 and each plotted reference color points may be preferably calculated for accuracy, only the reference color points 82-88 spatially adjacent or nearby the desired color point 80 will be discussed in this example.

Figure 4:
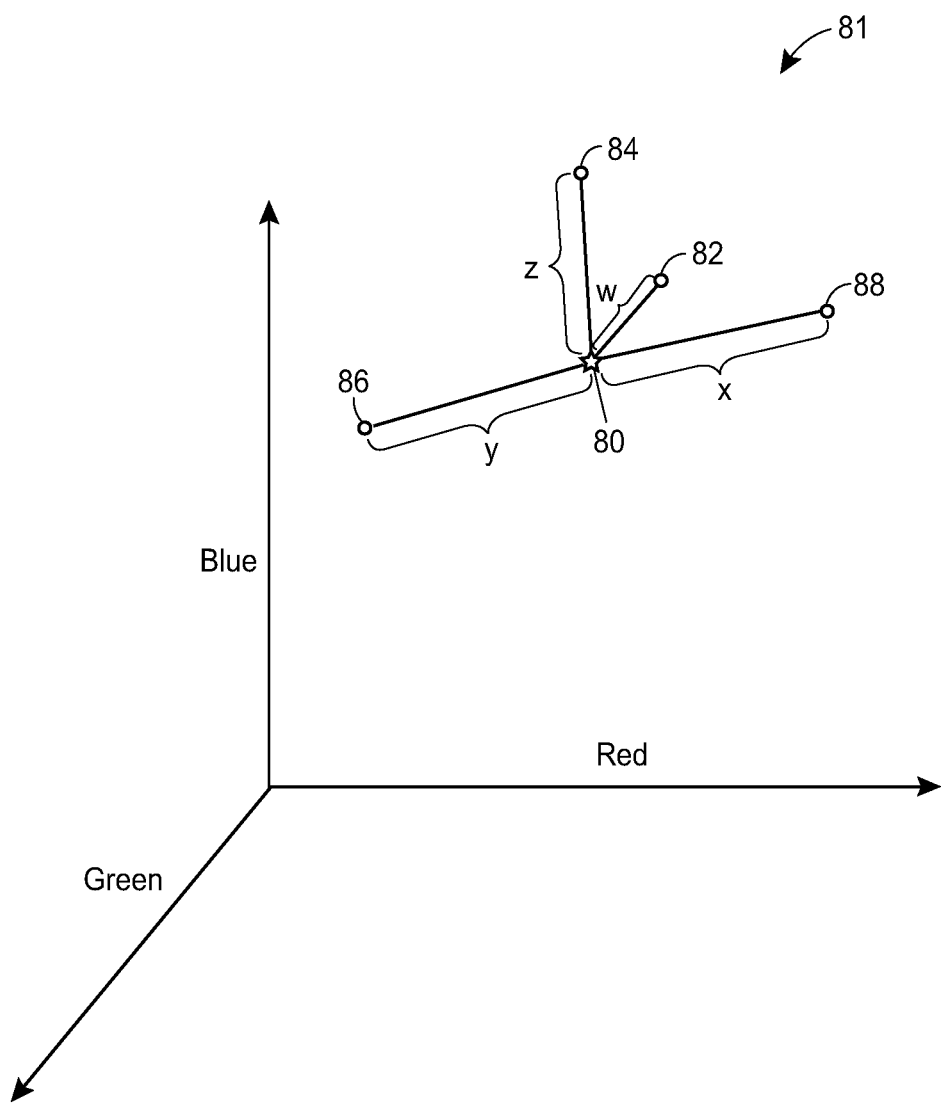
FIG. 4 is a magnified view of the example plot visualization that illustrates the desired color point and surrounding reference color points.

For instance, FIG. 4 illustrates a magnified view 81 of the plot visualization of the 3D color space 70 that only shows the desired color point 80 and the spatially adjacent reference color points 82-88 for the purpose of this example. Moreover, FIG. 4 illustrates four lengths of distance (e.g., a lengths w-z) that represents the four lengths between the desired color point 80 and each of the four adjacent reference color points 82-88, respectively. For example, the length x represents a spatial length of distance between the desired color point 80 and the reference color point 88. As another example, the length y represents a spatial length of distance between the desired color point 80 and the reference color point 84. The distance calculation module 24 may calculate and store each length of distance between the desired color point and each of the reference color points. The distance calculation module 24 may determine a particular length of distance in any manner used by those of ordinary skill in the art. Of course, the distance calculation module 24 may select multiple reference color points in certain implementations.

After the shortest length is selected, the color query module 22 may use the reference color point associated with the selected shortest length of distance to retrieve product information from the color reference database. The retrieved product information relating the selected reference color point may be sent to the client device 14 for display to the user, perform another function such as placing an order for the new siding, etc.

To further illustrate the techniques for matching the color of a siding sample, example methods that the color query module 22 may implement are discussed next with reference to FIG. 5. More generally, this method can be implemented in any suitable computing device or a group of devices and any suitable software application. In at least some of these implementations, the techniques for matching a siding sample can be implemented as sets of instructions stored on a computer-readable medium and executable on one or more processors.

Figure 5:
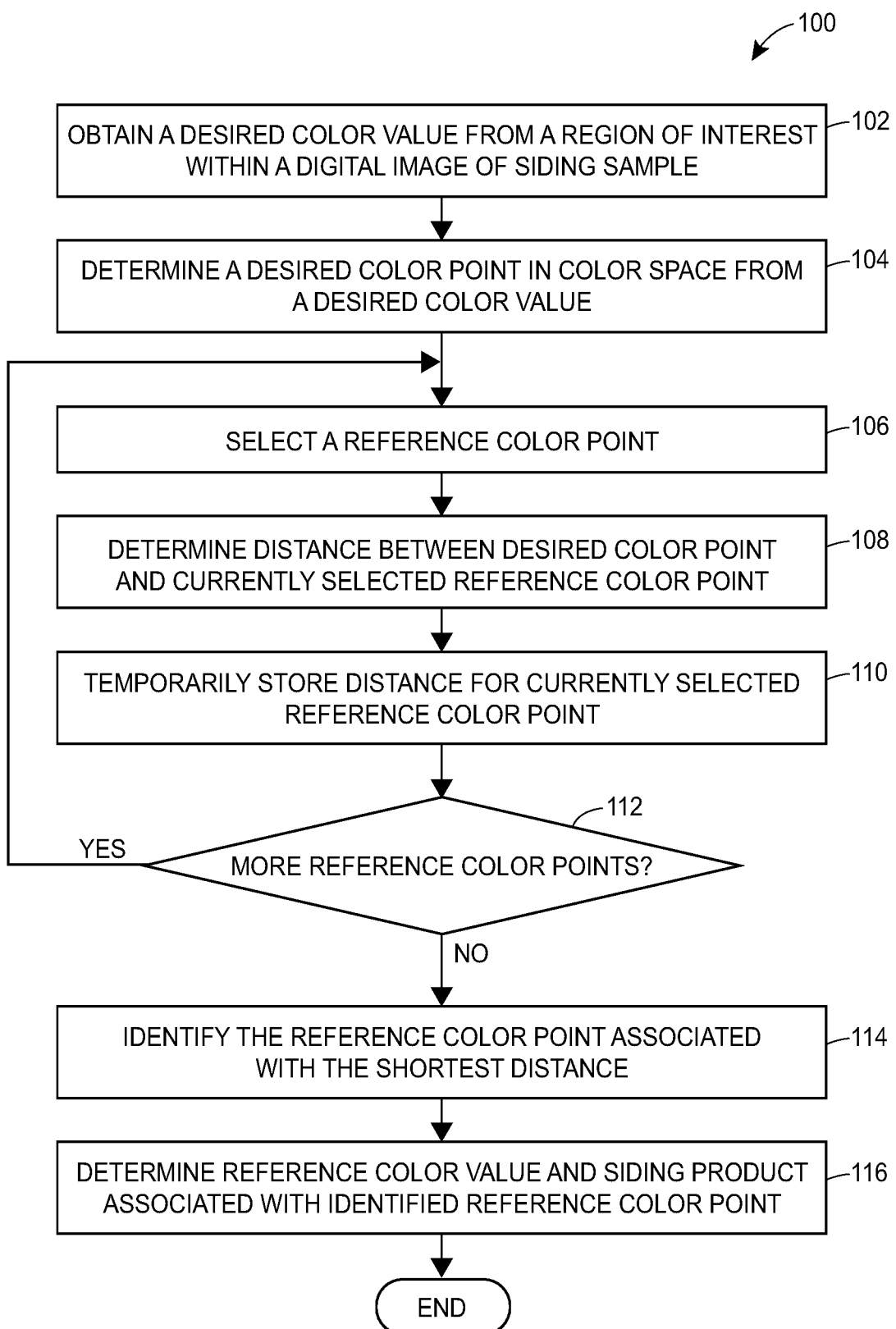
FIG. 5 is a flow diagram of an example method for determining a desired color point in a color space associated with a desired color value of a siding sample and for determining the closest matching reference color value to the desired color value and a siding product corresponding to the closest matching reference color value.

The flow diagram of FIG. 5 illustrates an example method 100 for matching color of a siding sample with a suitable replacement siding product. According to this method, a siding product is selected from a database of siding products based on most closely matching a digital image of a siding sample in color. The method 100 in a sense automatically selects a siding product that best matches a particular color within a digital image of a siding sample.

At a block 102, a desired color value from a region of interest 66 within a digital image of a siding sample is obtained. The user may denote the location of the region of interest 66 to indicate a desired color and a desired color value may be determined. Alternatively, the desired color may be automatically selected based on a determined predominate color for the entire sample piece of siding via image processing techniques. A user specified desired color value may be obtained at client device 14, or the color matching engine 12 may obtain the desired color value automatically.

A desired color point in a color space is determined based on the desired color value at a block 104. The color query module 22 may quantify, or convert if necessary, the desired color value into a desired color point in a color space. For instance, a 3D color space may be a RGB color space, a cyan-magenta-yellow-black (CMYK) color space, a hue-saturation-value (HSV) color space, a hue-saturation-light (HSL) color space, or a Lab color space (CIELab), or any other suitable color space.

According to the method 100, the color query module 22 may select and retrieve a reference color point from the color reference database 30 and plot the retrieved reference color point in the color space at a block 106. In response to the retrieval of the reference color point, the color query module 22 may compute a length of distance between the desired color point 80 and retrieved reference color point at a block 108. At a block 110, the color query module 22 may temporarily store the determined length of distance and associate the length with the currently selected reference color point. The color query module 22 may temporarily store this determined length in the memory.

At a block 112, the color query module 22 determines whether additional reference color points exist in the color reference database 30 by querying the database. If another reference color point exists in the color reference database 30, the method transfers control back to the block 106 that selects and retrieves another reference color point. In any event, after all reference color points in the color reference database 30 have been retrieved, the control flows to a block 114. The color query module 22 may compare each of the lengths to each other to determine the shortest length of distance from all the lengths. At the block 114, the color query module 22 identifies the reference color point associated with the determined shortest length of distance.

Alternatively, the color query module 22 may identify the reference color point in the color reference database 30 with the closest color match by any other suitable manner. For example, the color query module 22 may use machine learning algorithms to determine the best matching color or colors. Using this technique, the color matching system 10 may initially capture color reference data from multiple samples of different colors from digital images of sample siding. Similarly as described above, the color reference data of each captured color sample is converted or quantified into a color space, such as a 3D color space. The color matching system 10 may input each of these 3D reference color points, for example, into a training database (not shown) as features. Moreover, the color matching system 10 could be trained on these features into a model using one or more machine learning algorithms. The machine learning algorithms may generate representations of color space data instances and functions that evaluate these generated representations. Furthermore, the machine learning algorithms may generalize the color space data as well and create unseen data instances. In any event, the color matching system 10 could be trained on the color reference data to create a model used in identifying the closest color match to a desired color point. In fact, the model may identify the names or labels of the closest matching colors and/or the related product names.

In any event, the color query module 22 may determine the reference color value and the siding product associated with the identified reference color point at a block 116. Moreover, the color query module 22 may retrieve, from the database, any product information associated with the identified siding product, such as a product name, a product number, a manufacturer, etc. In turn, the color query module 22 may transmit this retrieved product information to the client device 14 for display to the user.

Furthermore, a confidence level calculation module 28 may use the calculated length to compute a confidence level that indicates the reliability that the identified color value associated with the shortest length of distance is substantially similar to the desired color value of the siding sample. For instance, the confidence level calculation module 28 may utilize a threshold or multiple thresholds to determine whether the shortest length of distance is sufficiently short (i.e., reliable) to the desired color value point. Moreover, each of these thresholds may be used in determining a different confidence levels. Alternatively, the confidence level calculation module 28 may use statistical analysis or any other suitable technique in determining whether a potential color match is sufficiently close. Furthermore, the confidence level calculation module 28 may generate a confidence level indicator that represents the reliability of the closest matched color. The confidence level indicator may include a numeric score, different colors to indicate different confidence levels, etc.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing an interface for inspecting indoor and outdoor map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for capturing a digital image of siding, the method comprising:
    displaying, via one or more processors, a positional overlay framing a digital image of a siding sample to be taken with an image capture device, the positional overlay including a color card reference area and a region of interest indicating a portion of the siding sample that has a first color value,
    wherein the positional overlay indicates instructions for (i) a distance to be maintained from the siding sample with respect to the image capture device, (ii) an orientation of the siding sample with respect to the image capture device before the digital image is captured, and (iii) a determination of a correct physical placing of a color reference card having a reference color value on the siding sample; and
    capturing, via the image capture device, the digital image at the distance, orientation, and correct physical placing of the color reference card according to the instructions.
2. The computer-implemented method of claim 1, the method further comprising:
    color normalizing, via one or more processors, the digital image based upon the reference color value of the color reference card positioned within the color card reference area, the color normalizing resulting in the first color value within the region of interest being adjusted to a second color value.
3. The computer-implemented method of claim 2, the method further comprising:
    calculating, via one or more processors, a set of spatial distances representing a difference between (i) the second color value plotted as a calculated quantified color point within a color space, and (ii) each known quantified color point from among a set of known quantified color points within the color space, each known quantified color point being associated with a respective replacement siding product from among a plurality of replacement siding products.
4. The computer-implemented method of claim 3, the method further comprising:
    determining which of the plurality of replacement siding products has a color that is closest match to that of the siding sample by identifying, via one or more processors, which of the plurality of replacement siding products produces the shortest spatial distance from among the set of spatial distances when compared to the calculated quantified color point.
5. The computer-implemented method of claim 4, further comprising:
    calculating, via one or more processors, a numeric score based upon the shortest spatial distance that is indicative of a similarity between (i) the known quantified color point associated with the replacement siding product having the closest matching color, and (ii) the calculated quantified color point associated with the second color value.
6. The computer-implemented method of claim 5, wherein the act of calculating the numeric score further comprises:
    calculating the numeric score based upon whether the length of the shortest spatial distance is less than one or more spatial length thresholds,
    wherein a shorter spatial length threshold is indicative of a greater similarity between (i) the known quantified color point associated with the replacement siding product having the closest matching color to the siding sample and, (ii) the calculated quantified color point associated with the second color value.
7. The computer-implemented method of claim 4, wherein the color space is a three-dimensional (3D) color space and includes at least one of a red-green-blue (RGB) color space, a cyan-magneta-yellow-black (CMYK) color space, a hue-saturation-value (HSV) color space, a hue-saturation-light (HSL) color space, or a Lab color space (CIELab).
8. The computer-implemented method of claim 4, further comprising:
    Identifying, via one or more processors, at least one of a product name, a product number, or a manufacturer associated with the replacement siding product having the closest matching color to the siding sample.
9. The computer-implemented method of claim 1, further comprising: identifying, via one or more processors, the region of interest as an area within the positional overlay that is selected by a user.
10. The computer-implemented method of claim 1, wherein the act of displaying the positional overlay comprises:

displaying the positional overlay such that, when the digital image of the siding sample is captured, flat portions of the siding are parallel to a lens of the image capture device to reduce glare.

11. A mobile computing device configured to acquire a digital image of siding, the device comprising:
   an image capture device configured to capture a digital image of a siding sample; and
   a display configured to present a positional overlay framing the digital image while the digital image is being captured, the positional overlay including a color card reference area and a region of interest indicating a portion of the siding sample that has a first color value,
   wherein the positional overlay indicates instructions for (i) an orientation of the siding sample with respect to the image capture device before the digital image is captured, and (ii) a determination of a correct physical placing of a color reference card having a reference color value on the siding sample, and
   the image capture device is further configured to capture the digital image at the orientation and correct physical placing of the color reference card according to the instructions.

12. The mobile computer device of claim 11, the device further comprising:
   one or more processors configured to transmit the digital image to a color matching engine, the color matching engine being configured to:
   color normalize the digital image based upon the reference color value of the color reference card positioned within the color card reference area, the color normalizing resulting in the first color value within the region of interest being adjusted to a second color value,
   calculate a set of spatial quantified color point within a color space, and (ii) each known quantified color point from among a set of known quantified color points within the color space, each known quantified color point being associated with a respective replacement siding product from among a plurality of replacement siding products; and
   determine which of the plurality of replacement siding products has a color that is a closest match to that of the siding sample by identifying which of the plurality of replacement siding products produces the shortest spatial distance from among the set of spatial distances when compared to the calculated quantified color point.

13. The mobile computing device of claim 12, wherein:
   the color matching engine calculates a numeric score based upon the shortest spatial distance that is indicative of similarity between (i) the known quantified color point associated with the replacement siding product having the closest matching color to the siding sample, and (ii) the calculated quantified color point associated with the second color value,
   the numeric score is based upon whether the length of the shortest spatial distance is less than one or more spatial length thresholds, and
   a shorter spatial length threshold is indicative of a greater similarity between the known quantified color point associated with the replacement siding product having the closest matching color to the siding sample and the calculated quantified color point associated with the second color value.

14. The mobile computing device of claim 12, wherein the color space is a three-dimensional (3D) color space and includes at least one of a red-green-blue (RGB) color space, a cyan-magenta-yellow-black (CMYK) color space, a hue-saturation-value (HSV) color space, a hue-saturation-light (HSL) color space, or a Lab color space (CIELab).

15. The mobile computing device of claim 12, wherein the color matching engine identifies at least one a product name, a product number, or a manufacturer associated with the replacement siding product having the closest matching color to the siding sample.

16. The mobile computing device of claim 11, wherein the one or more processors are further configured to identify the region of interest as an area within the positional overlay that is selected by a user.

17. The mobile computing device of claim 11, wherein the display is further configured to present the positional overlay such that, when the image capture device captures the digital image of the siding sample, flat portions of the siding are parallel to a lens of the image capture device to reduce glare.

18. A computer system configured to acquire digital images of siding, the system comprising:
   a mobile computing device configured to:
   display a positional overlay framing a digital image of a siding sample to be taken with an image capture device, the positional overlay including a color card reference area and a region of interest indicating a portion of the siding sample that has a first color value,
   wherein the positional overlay indicates instructions for (i) an orientation of the siding sample with respect to the image capture device before the digital image is captured, and (ii) a determination of a correct physical placing of a color reference card having a reference color value on the siding sample; and
   capture the digital image with the image capture device at the orientation and correct physical placing of the color reference card according to the instructions.

19. The computer system of claim 18, the system further comprising:
   a color matching engine configured to:
   receive the captured digital image from the mobile computing device;
   color normalize the digital image based upon the reference color value of the color reference and positioned within the color card reference area, the color normalizing resulting in the first color value within the region of interest being adjusted to a second color value; and
   calculate a set of spatial distances representing a difference between (i) the second color value plotted as a calculated quantified color point within a color space, and (ii) each know quantified color point from among a set of known quantified color points within the color space, each known quantified color point being associated with a respective replacement siding product from among a plurality of replacement siding products.

20. The computer system of claim 19, the system further comprising:
   determine which of the plurality of replacement siding products has a color that is a closest match to that of the siding sample by identifying which of the plurality of replacement siding products produces the shortest spatial distance from among the set of spatial distances when compared to the calculated quantified color point, and
   transmit an indication of the replacement siding product having the closest matching color to the siding sample to the mobile computing device.

* * * * *